United States Patent
Bouvigne

(10) Patent No.: US 11,863,966 B2
(45) Date of Patent: Jan. 2, 2024

(54) CONNECTED SPEAKER COMPRISING A LAN INTERFACE AND A WPAN INTERFACE

(71) Applicant: SAGEMCOM BROADBAND SAS, Rueil Malmaison (FR)

(72) Inventor: Gabriel Bouvigne, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 86 days.

(21) Appl. No.: 17/124,052

(22) Filed: Dec. 16, 2020

(65) Prior Publication Data

US 2021/0195364 A1    Jun. 24, 2021

(30) Foreign Application Priority Data

Dec. 20, 2019  (FR) ..................... 1915298

(51) Int. Cl.
*H04R 5/02* (2006.01)
*H04S 7/00* (2006.01)
*H04R 3/12* (2006.01)

(52) U.S. Cl.
CPC .............. *H04S 7/308* (2013.01); *H04R 3/12* (2013.01); *H04S 7/301* (2013.01); *H04R 2420/07* (2013.01); *H04S 2400/01* (2013.01)

(58) Field of Classification Search
CPC ...... H04S 7/308; H04S 7/301; H04S 2400/01; H04R 3/12; H04R 2420/07
USPC .................................................. 381/303, 300
See application file for complete search history.

(56) References Cited

U.S. PATENT DOCUMENTS

| | | | |
|---|---|---|---|
| 2015/0098576 A1* | 4/2015 | Sundaresan | H04L 43/0894 381/58 |
| 2018/0020308 A1* | 1/2018 | Lai | H04L 65/1069 |
| 2018/0288677 A1* | 10/2018 | Jain | H04M 1/72412 |
| 2020/0221519 A1* | 7/2020 | Bao | H04R 1/025 |

FOREIGN PATENT DOCUMENTS

EP        2893531        7/2015

* cited by examiner

*Primary Examiner* — Ammar T Hamid
(74) *Attorney, Agent, or Firm* — MUNCY, GEISSLER, OLDS & LOWE, P.C.

(57) ABSTRACT

Connected speaker (1) comprising:
  a LAN interface (2);
  a WPAN interface (3);
  pairing means (5) designed to pair the connected speaker with one or more external speakers (6) each equipped with an external WPAN interface (7);
  processing means (8) designed to acquire an input audio signal from an audio source (15) via the LAN interface, to produce at least one distributed audio signal from the input audio signal, to allocate each distributed audio signal to one of the external speakers (6) paired with the connected speaker, and to transmit, to each external speaker, via the WPAN interface (3) of the connected speaker (1) and the external WPAN interface (7) of said external speaker (6), the distributed audio signal that is allocated to said external speaker (6), such that the connected speaker (1) and the external speakers (6) form a multichannel audio playback system.

21 Claims, 7 Drawing Sheets

_US 11,863,966 B2_

CONNECTED SPEAKER COMPRISING A LAN INTERFACE AND A WPAN INTERFACE

CROSS REFERENCE TO RELATED APPLICATIONS

This application claims priority of Application No. 1915298 filed in France on Dec. 20, 2019 under 35 U.S.C. § 119, the entire contents of which are hereby incorporated by reference.

The invention relates to the field of connected speakers.

BACKGROUND OF THE INVENTION

Nowadays, connected speakers equipped with a Wi-Fi interface provide numerous functionalities and are highly valued by users. In particular, it is possible to connect a Wi-Fi speaker to a decoder box (or STB, for set-top box) in order to improve the acoustic experience of a user when playing back audio/video content (a film for example).

However, some users who already own a speaker equipped with a Bluetooth interface are not very inclined to procure a Wi-Fi speaker.

Specifically, as there is no simple and widespread solution for making a Wi-Fi speaker and a Bluetooth speaker interact, these users think that, if they purchase a Wi-Fi speaker, their Bluetooth speaker becomes needless and their initial investment, that is to say the purchase of the Bluetooth speaker, is lost. The cost of the Bluetooth speaker therefore turns into a needless excess cost in the total cost of the audio playback system.

Numerous approaches have been contemplated to use the Bluetooth speaker in spite of this, and in particular to use the Bluetooth speaker with a decoder box to which a Wi-Fi speaker is also possibly connected.

A first approach consists in connecting the Bluetooth speaker to the decoder box using a Bluetooth transmitter. This solution therefore requires additional equipment (the Bluetooth transmitter), and therefore increases the cost of the audio playback system. In addition, using the Bluetooth transmitter leads to a latency that is not communicated to the decoder box and is therefore not known thereto. Using the Bluetooth transmitter also does not make it possible to mix different connectivities.

A second approach consists in allowing a decoder box to use speakers of several different types. This solution requires the presence of a Bluetooth interface on the decoder box, which is rarely the case. This solution also requires the decoder box to be designed specifically to implement this.

These approaches are therefore relatively expensive and complex, and therefore do not make it possible to significantly improve the commercial appeal of a Wi-Fi speaker with regard to the user concerns explained above.

OBJECT OF THE INVENTION

The purpose of the invention is to allow a Bluetooth speaker to be reused when a Wi-Fi speaker is added to an audio playback system.

SUMMARY OF THE INVENTION

In order to achieve this aim, what is proposed is a connected speaker comprising:
a LAN interface;
a WPAN interface;
pairing means designed to pair the connected speaker with one or more external speakers each equipped with an external WPAN interface;
processing means designed to acquire an input audio signal from an audio source via the LAN interface, to produce at least one distributed audio signal from the input audio signal, to allocate each distributed audio signal to one of the external speakers paired with the connected speaker, and to transmit, to each external speaker, via the WPAN interface of the connected speaker and the external WPAN interface of said external speaker, the distributed audio signal that is allocated to said external speaker, such that the connected speaker and the external speakers form a multichannel audio playback system.

The external speakers (for example Bluetooth speakers) paired with the connected speaker according to the invention thus form audio channels, for example rear audio channels, of the multichannel audio playback system that incorporates the connected speaker and the external speakers. The connected speaker according to the invention therefore makes it possible to reuse the external speakers to form the multichannel audio playback system, which improves sound playback. The user therefore no longer has the impression of having "wasted" his initial investment in purchasing the external speaker or speakers, and is therefore more inclined to procure the connected speaker according to the invention, the commercial appeal of which has therefore been improved.

What is also proposed is a connected speaker such as the one that has just been described, the connected speaker being able to be paired individually with at least two external speakers, the connected speaker being designed to transmit, directly to each external speaker, the distributed audio signal that is allocated to said external speaker.

What is also proposed is a connected speaker such as the one that has just been described, the connected speaker being able to be paired with a first external speaker that is itself paired with a second external speaker, the connected speaker being designed to transmit, directly to the first external speaker, a first distributed audio signal allocated to the first external speaker and a second distributed audio signal allocated to the second external speaker, the second distributed audio signal then being able to be transmitted to the second external speaker by the first external speaker.

What is also proposed is a connected speaker such as the one that has just been described, the connected speaker being a multichannel speaker.

What is also proposed is a connected speaker such as the one that has just been described, the connected speaker being a single-channel speaker designed to be connected to another connected speaker via the LAN interface.

What is also proposed is a connected speaker such as the one that has just been described, the connected speaker furthermore being designed to evaluate a transmission and playback latency resulting from the transmission of a distributed audio signal to an external speaker via the WPAN interface, and from the playback of the distributed audio signal by the external speaker.

What is also proposed is a connected speaker such as the one that has just been described, wherein the transmission and playback latency is evaluated on the basis of a codec used to transmit the distributed audio signal.

What is also proposed is a connected speaker such as the one that has just been described, wherein the transmission and playback latency is evaluated using a calibration method involving a user, the calibration method comprising the steps of simultaneously having the connected speaker emit a first sound and the external speaker emit a second sound, and adjusting a time offset applied to an output of the connected speaker connected to the external speaker until the user hears the first sound and the second sound simultaneously.

What is also proposed is a connected speaker such as the one that has just been described, wherein the transmission and playback latency is evaluated on the basis of a model of the external speaker.

What is also proposed is a connected speaker such as the one that has just been described, the connected speaker incorporating or being connected to a microphone, the connected speaker being designed to transmit a test audio signal to the external speaker via the WPAN interface, to control the external speaker such that it emits an emitted test sound signal produced from the test audio signal, to acquire a received test sound signal via the microphone, and to estimate the transmission and playback latency based on the test audio signal and the received test sound signal.

What is also proposed is a connected speaker such as the one that has just been described, wherein the transmission latency is evaluated by calculating a cross-correlation between the test audio signal and the received test sound signal.

What is also proposed is a connected speaker such as the one that has just been described, wherein the cross-correlation is calculated in the time domain.

What is also proposed is a connected speaker such as the one that has just been described, wherein the cross-correlation is calculated in the frequency domain.

What is also proposed is a connected speaker such as the one that has just been described, the connected speaker being designed to reduce a sampling frequency of the test audio signal and of the received test sound signal, to calculate a first approximation of the transmission and playback latency, and then to increase the sampling frequency and to recalculate the transmission and playback latency while keeping only a time window of limited duration centred around the first approximation of the transmission and playback latency.

What is also proposed is a connected speaker such as the one that has just been described, wherein the emitted test sound signal is superimposed on a useful sound signal of played-back audio content.

What is also proposed is a connected speaker such as the one that has just been described, wherein the emitted test sound signal is a signal that is normally inaudible to a human being.

What is also proposed is a connected speaker such as the one that has just been described, the connected speaker being designed to adjust a gain and/or to perform a frequency adjustment on at least one audio channel incorporating an external speaker.

What is also proposed is a connected speaker such as the one that has just been described, the connected speaker being designed to evaluate a value of a read latency of the connected speaker, and to transmit the value of the read latency to the audio source.

What is also proposed is a connected speaker such as the one that has just been described, wherein the pairing means implement pairing using the A2DP Bluetooth profile.

What is also proposed is a connected speaker such as the one that has just been described, wherein the pairing means comprise a physical button.

What is also proposed is a connected speaker such as the one that has just been described, wherein the pairing means comprise a pairing module designed to interact with a configuration interface provided by an API or by a configuration webpage.

What is also proposed is a connected speaker such as the one that has just been described, wherein the LAN interface is a Wi-Fi interface.

What is also proposed is a connected speaker such as the one that has just been described, wherein the LAN interface is an Ethernet interface.

What is also proposed is a connected speaker such as the one that has just been described, wherein the WPAN interface is a Bluetooth interface.

What is furthermore proposed is an audio playback method implemented in a connected speaker as described above, comprising the steps of:

pairing the connected speaker with one or more external speakers each equipped with an external WPAN interface;

acquiring an input audio signal from an audio source via the LAN interface;

producing at least one distributed audio signal from the input audio signal;

allocating each distributed audio signal to one of the external speakers paired with the connected speaker;

transmitting, to each external speaker, via the WPAN interface of the connected speaker and the external WPAN interface of said external speaker, the distributed audio signal that is allocated to said external speaker, such that the connected speaker and the external speakers form a multi-channel audio playback system.

What is additionally proposed is a computer program comprising instructions that lead the connected speaker as described above to execute the steps of the audio playback method as described above.

What is furthermore proposed is a computer-readable recording medium on which the computer program that has just been described is recorded.

The invention will be better understood in the light of the following description of particular non-limiting modes of implementation of the invention.

BRIEF DESCRIPTION OF THE DRAWINGS

Reference will be made to the appended drawings, in which.

DETAILED DESCRIPTION OF THE INVENTION

Figure 1:
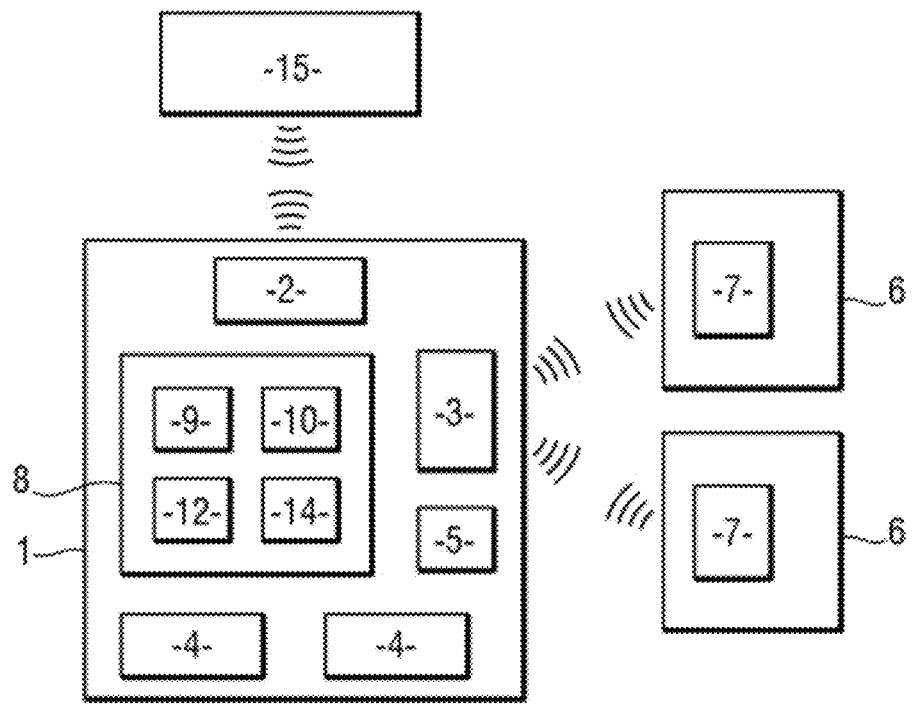
FIG. 1 schematically shows a connected speaker according to the invention.

With reference to FIG. 1, the connected speaker according to the invention 1 comprises two connectivity interfaces: a LAN (for local area network) interface and a WPAN (for wireless personal area network) interface.

The technology used by the LAN interface is for example a Wi-Fi technology or an Ethernet technology.

The technology used by the WPAN interface is for example Bluetooth technology, ZigBee technology, UWB (for ultra-wideband) technology, or else an infrared technology, a wireless optical communication technology, etc.

In this case, the LAN interface is a Wi-Fi interface 2 and the WPAN interface is a Bluetooth interface 3.

The connected speaker 1 may be a single-channel speaker or a multichannel speaker. The connected speaker 1 comprises one or more loudspeakers 4.

Figure 2:
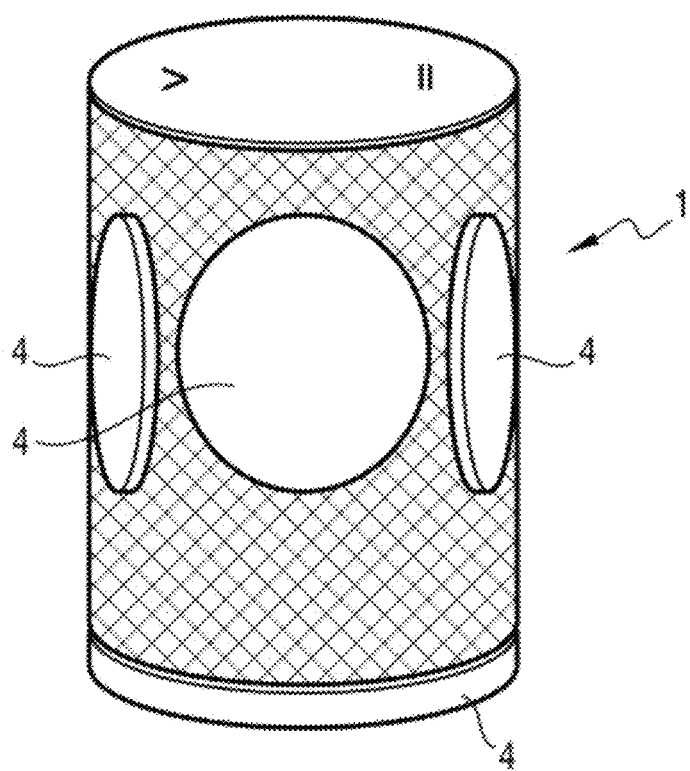
FIG. 2 is a perspective view of a connected speaker.

The connected speaker 1 is for example similar to the connected speaker 1 in FIG. 2, which is a multichannel speaker capable of playing back several audio channels and comprising a plurality of loudspeakers 4.

The connected speaker 1 additionally comprises pairing means 5 for pairing the connected speaker 1 with one or more external speakers 6 each equipped with an external Bluetooth interface 7. Reference will be made here to a Bluetooth speaker to denote such an external speaker 6.

The pairing means 5 of the connected speaker 1 in this case comprise one or more physical buttons, or else a pairing module. The pairing module is a software and/or hardware module integrated into the connected speaker 1. The pairing module allows pairing via a configuration interface. The configuration interface may be provided by an API (for application programming interface) or by a configuration webpage, allowing this configuration to be accessed via a browser, via an application, or via external equipment. The interface and/or the configuration APIs may be local (that is to say implemented in the connected speaker) and/or remote (this is the case for a server/cloud solution).

Advantageously, the pairing means 5 implement pairing using the A2DP (for advanced audio distribution profile) Bluetooth profile between the connected speaker 1 and the external speakers 6. This profile enables a better audio quality than the HFP (hands-free profile) Bluetooth profile, which may however also be used.

The connected speaker 1 furthermore comprises processing means 8 comprising at least one processing component 9, an acquisition module 10, a decoder module 12 and a splitter module 14.

The processing component 9 is for example a microcontroller, a processor, or else a programmable logic circuit such as an FPGA (for field-programmable gate array) or an ASIC (for application-specific integrated circuit).

The acquisition module 10 is designed to acquire an input audio signal from an audio source via the Wi-Fi interface 2.

The audio source is for example a decoder box 15. The decoder module 12 decodes the input audio signal. The splitter module 14 produces at least one distributed audio signal and an audio signal with a local destination (played by the connected speaker 1) from the input audio signal. The processing means 8 then allocate each distributed audio signal to one of the Bluetooth speakers 6 paired with the connected speaker 1. The processing means 8 transmit, to each Bluetooth speaker 6 paired with the connected speaker 1, via the Bluetooth interface 3 of the connected speaker and the external Bluetooth interface 7 of said Bluetooth speaker 6, the distributed audio signal that is allocated thereto, such that the connected speaker 1 and the Bluetooth speakers 6 form a multichannel audio playback system.

Figure 3:
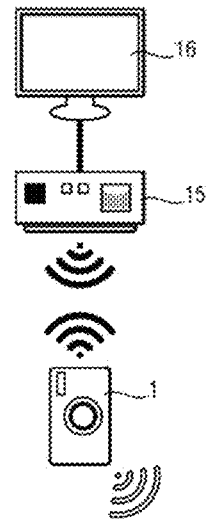
FIG. 3 shows a connected speaker according to the invention, two Bluetooth speakers, and a decoder box connected to a television.
Figure 3:
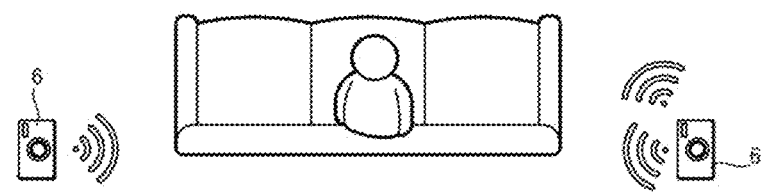

With reference to FIG. 3, the connected speaker 1 is thus integrated into a multichannel audio playback system that comprises, in addition to the connected speaker 1, an audio source, in this case the decoder box 15 connected to a television 16, and two Bluetooth speakers 6 paired with the connected speaker 1. It will be noted that the multichannel audio playback system is in reality an audio/video playback system, but only the audio flow and the sound signals exchanged in the system are of interest here.

In this multichannel audio playback system, the Bluetooth speakers 6 are considered to be surround rear channel speakers.

Figure 4:
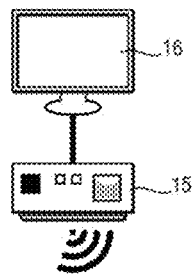
FIG. 4 shows a first connected speaker paired with two Bluetooth speakers, and a second connected speaker.
Figure 4:
Figure 4:
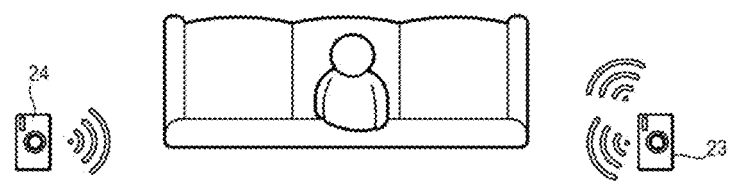

With reference to FIG. 4, it will be noted that the multichannel audio playback system could perfectly well comprise a first connected speaker 21 and a second connected speaker 22 that each comprise a Wi-Fi interface, and at least one of the two Wi-Fi speakers comprises a Bluetooth interface. In this case, the first connected speaker 21 is paired with a first Bluetooth speaker 23 that is itself paired with a second Bluetooth speaker 24.

In this configuration, it is preferable for one of the two connected speakers to perform the role of a master connected speaker. The first connected speaker 21 in this case performs the role of the master connected speaker.

The decoder box 15 transmits the input audio signal to the first connected speaker 21, which receives it through its Wi-Fi interface. The first connected speaker 21 then takes responsibility for distributing the sound channels (left-hand, right-hand and central audio channels) between the first connected speaker 21 and the second connected speaker 22. In particular, the first connected speaker 21 transmits, to the second connected speaker 22, via its Wi-Fi interface and via the Wi-Fi interface of the second connected speaker 22, a distributed audio signal allocated by the processing means of the first connected speaker 21 to the second connected speaker 22.

What is now of more particular interest is the pairing between the connected speaker or speakers and the Bluetooth speakers.

Figure 5:
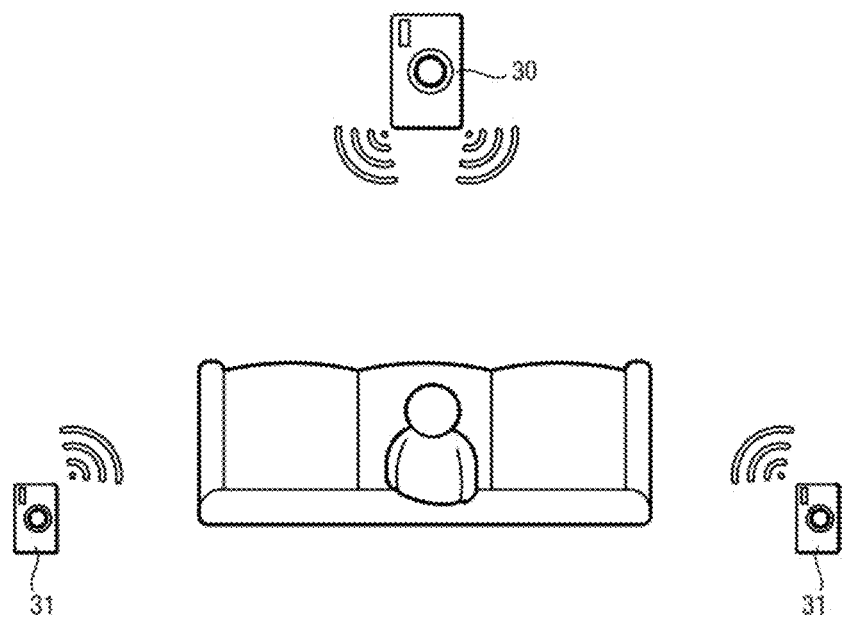
FIG. 5 shows a connected speaker paired with two Bluetooth speakers.

With reference to FIG. 5, the connected speaker 30, which is a multichannel speaker, is paired, via its Bluetooth interface, with the external Bluetooth interfaces of two Bluetooth speakers 31. The two Bluetooth speakers 31 are each paired individually with the connected speaker 30. The connected speaker 30, from the input audio signal that it receives from the decoder box, produces two distributed audio signals that are each allocated to one of the Bluetooth speakers 31, and transmits, directly to each of the two Bluetooth speakers 31, the distributed audio signal that is allocated to said Bluetooth speaker 31.

Figure 6:
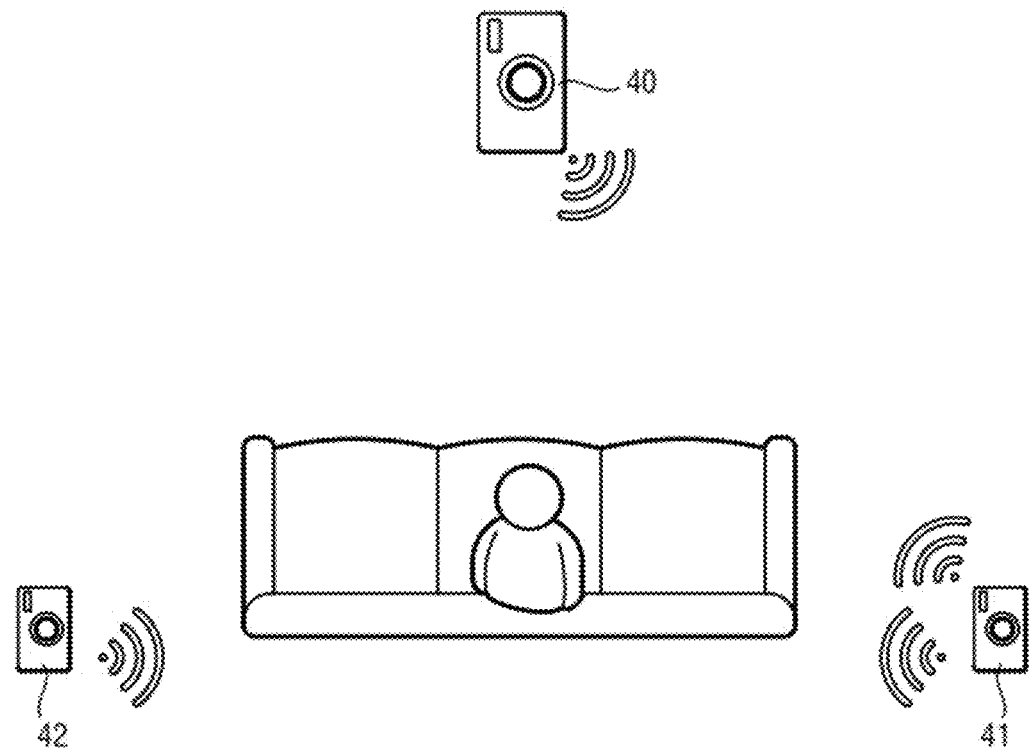
FIG. 6 shows a connected speaker paired with a first Bluetooth speaker that is itself paired with a second Bluetooth speaker.

With reference to FIG. 6, the connected speaker 40, which is a multichannel speaker, is paired, via its Bluetooth interface, with a (single) first Bluetooth speaker 41, which is itself paired with another second Bluetooth speaker 42. The connected speaker 40 transmits, directly to the first Bluetooth speaker 41, a first distributed audio signal allocated by the processing means of the connected speaker 40 to the first Bluetooth speaker 41, and a second distributed audio signal allocated by the processing means of the connected speaker 40 to the second Bluetooth speaker 42. The second distributed audio signal is then transmitted by the first Bluetooth speaker 41 to the second Bluetooth speaker 42.

Figure 7:
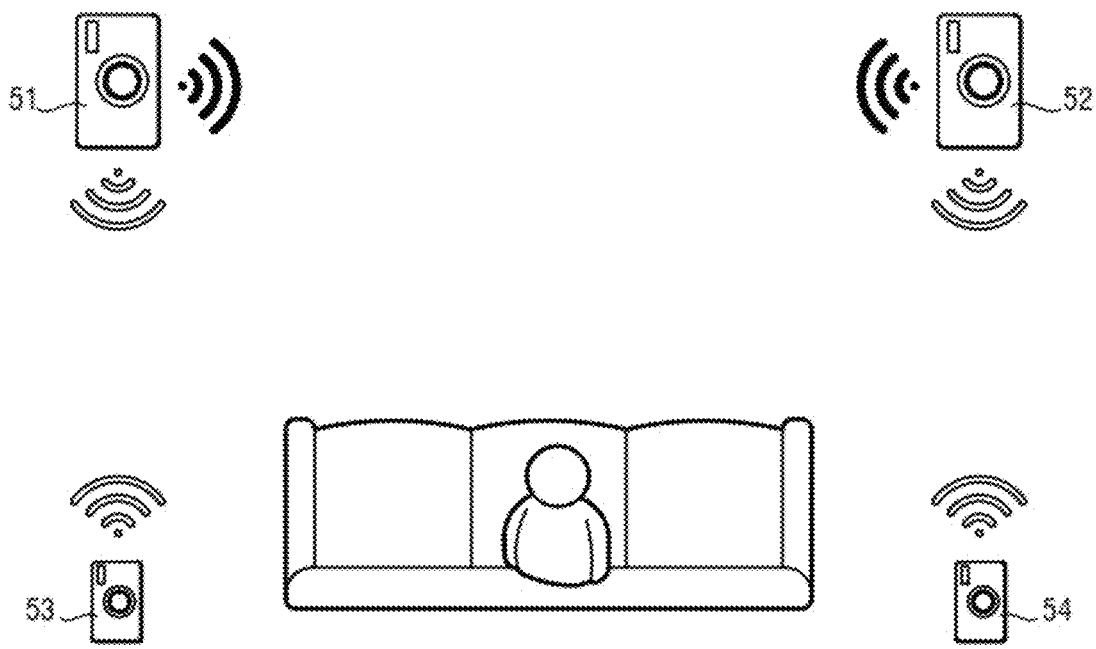
FIG. 7 shows a first connected speaker paired with a first Bluetooth speaker and a second connected speaker paired with a second Bluetooth speaker.

With reference to FIG. 7, the single multichannel connected speaker is this time replaced with a first connected speaker 51 and a second connected speaker 52 that are both single-channel speakers. The first connected speaker 51 is paired with the first Bluetooth speaker 53 and transmits, directly thereto, a first distributed audio signal that is allocated thereto. The second connected speaker 52 is paired with the second Bluetooth speaker 54 and transmits, directly thereto, a second distributed audio signal that is allocated thereto.

Figure 8:
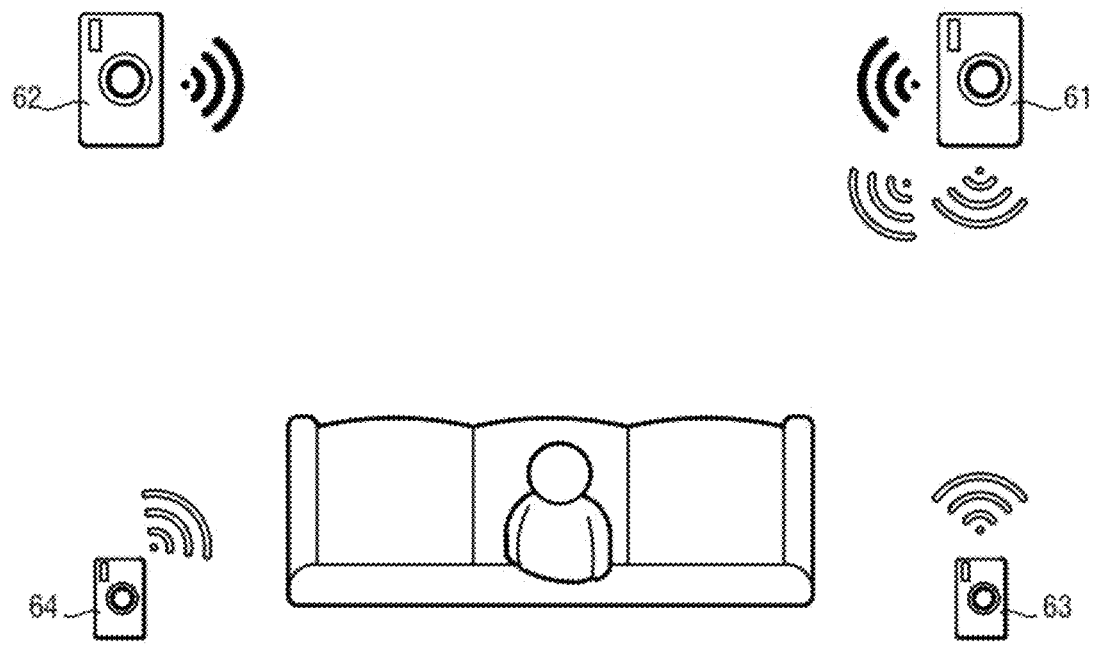
FIG. 8 shows a first connected speaker paired with a first Bluetooth speaker and with a second Bluetooth speaker, and a second connected speaker.

With reference to FIG. 8, the multichannel audio playback system again comprises a first connected speaker 61 and a second connected speaker 62 that are both single-channel speakers.

The first connected speaker 61 is paired individually with a first Bluetooth speaker 63 and individually with a second Bluetooth speaker 64. The first connected speaker 61 then transmits, directly to the first Bluetooth speaker, a first distributed audio signal allocated by the processing means of the first connected speaker 61 to said first Bluetooth speaker 63, and transmits, directly to the second Bluetooth speaker 64, a second distributed audio signal allocated by the processing means of the first connected speaker 61 to said second Bluetooth speaker 64.

Figure 9:
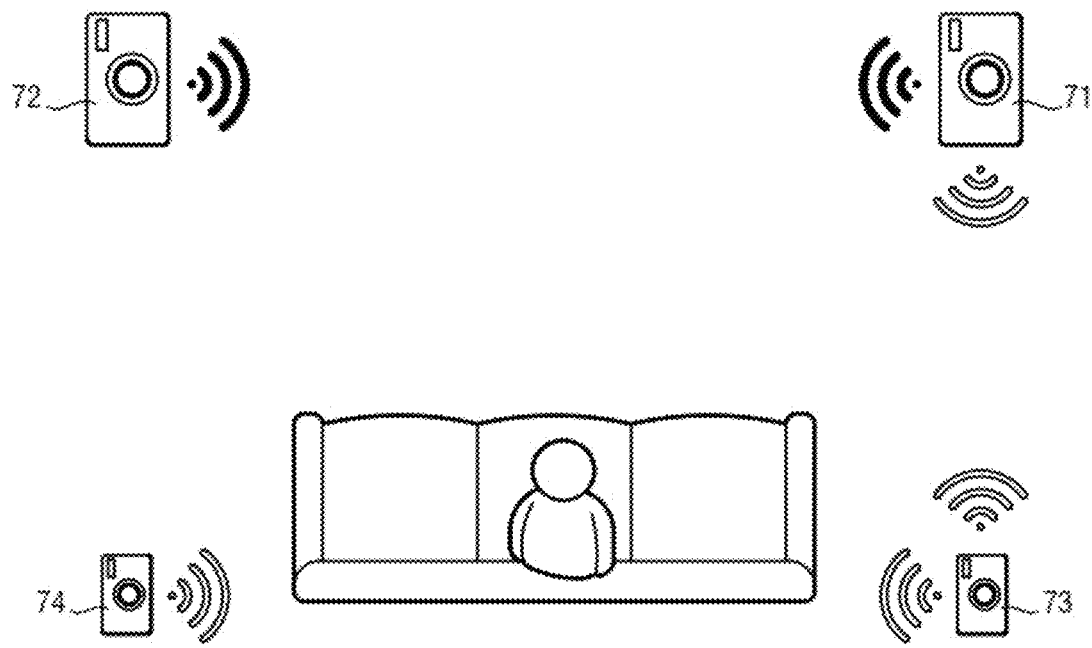
FIG. 9 shows a first connected speaker paired with a first Bluetooth speaker that is itself paired with a second Bluetooth speaker, and a second connected speaker.

With reference to FIG. 9, the multichannel audio playback system again comprises a first connected speaker 71 and a second connected speaker 72 that are single-channel speakers.

The first connected speaker 71 is paired with a first Bluetooth speaker 73 that is itself paired with a second Bluetooth speaker 74.

The first connected speaker 71 transmits, directly to the first Bluetooth speaker 73, a first distributed audio signal allocated by the processing means of the first connected speaker 71 to the first Bluetooth speaker 73, and a second distributed audio signal allocated by the processing means of the first connected speaker 71 to the second Bluetooth speaker 74.

The first Bluetooth speaker 73 then transmits the second distributed audio signal to the second Bluetooth speaker 74.

It will be noted that, if two connected speakers are used, it is preferable for the Bluetooth speakers to be paired with just one of the connected speakers.

Specifically, during a Bluetooth-based audio read operation, the clock of the target, that is to say of the Bluetooth speaker, is slaved to the clock of the source, that is to say of the connected speaker. It is then more reliable, in order to counter any clock drift, for the clocks of the two Bluetooth speakers to be slaved to a single source clock rather than to two different source clocks.

The Bluetooth-based transmission of a distributed audio signal and the playback thereof by a Bluetooth speaker paired with the connected speaker introduces a transmission and playback latency.

Thus, in the multichannel audio playback system, in order for the front audio channel (comprising one or more connected speakers) and rear audio channel (comprising one or more Bluetooth speakers) to be played back synchronously, it is necessary to take into consideration the transmission and playback latency in order to compensate it. The transmission and playback latency is therefore evaluated. The evaluation of the transmission and playback latency is used to ensure synchronous playback by the multichannel audio playback system.

This "overall" latency is linked to the transmission, but also to the playback of the distributed audio signal, and therefore to the software/hardware implementation of the Bluetooth speaker (decoding and buffering).

The transmission latency is substantially equivalent regardless of the A2DP codec, whereas the overall transmission and playback latency is heavily influenced by the choice of the A2DP codec.

In a first embodiment, the transmission and playback latency is evaluated on the basis of a codec used to transmit the distributed audio signal.

Specifically, it is possible, depending on the complexity and the coding/decoding latency of the codec that is used, to obtain expected approximations of the transmission and playback latency for a Bluetooth link. For example:

AptX codec: 40 ms;
SBC codec: 150 ms;
AAC codec: 400 ms.

In the absence of any other information, it is possible to use these values as default values. These values will be used as such if the Bluetooth speakers are individually associated with the connected speaker. These values will be doubled if a pair of Bluetooth speakers is associated with the connected speaker, since two successive Bluetooth transmissions are used (this case corresponds for example to FIGS. 6 and 9).

In a second embodiment, the connected speaker implements a calibration method involving a user in order to evaluate the transmission and playback latency.

Figure 10:
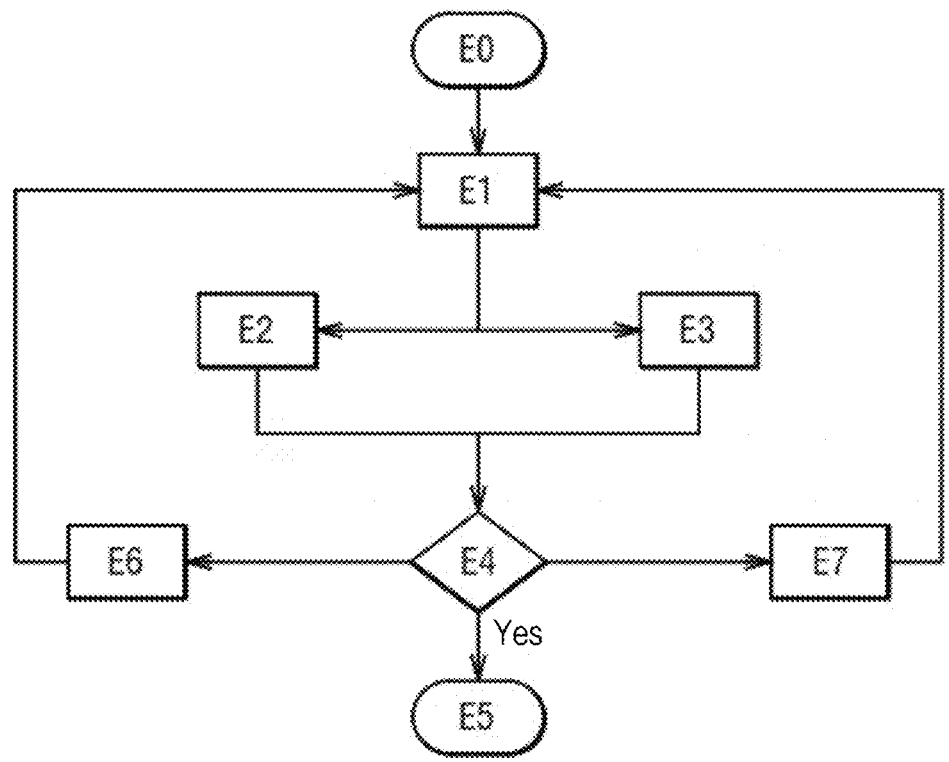
FIG. 10 shows steps of a calibration method intended to adjust the transmission and playback latency.

The calibration method is launched by the user. The calibration method is potentially mandatory when the multichannel audio playback system is first used. The steps of the calibration method may be seen in FIG. 10.

A time offset value is applied by default to the Bluetooth output of the connected speaker (step E0).

The calibration method then begins (step E1).

A brief first sound is played on the front audio channels, that is to say by the connected speaker (or by the connected speakers): step E2. A brief second sound of a different frequency is played on the rear audio channels, that is to say by the Bluetooth speaker (or by the Bluetooth speakers): step E3. In this case, for example, the first sound is more high-pitched than the second sound. The first sound and the second sound are emitted simultaneously.

The user indicates whether the higher-pitched sound (that is to say the first sound) is heard before, at the same time as or after the other sound (the second sound): step E4.

If the first sound and the second sound are synchronized and are therefore heard at the same time by the user, the calibration method ends: step E5.

If the first sound is first, the connected speaker increases the time offset applied to the Bluetooth output of the connected speaker that is connected to the Bluetooth speakers. The calibration method then returns to step E1, and the connected speaker emits the first sound and the second sound again (with the adjusted time offset): step E6.

If the second sound is first, the connected speaker reduces the time offset applied to the Bluetooth output of the connected speaker. The calibration method then returns to step E1, and the connected speaker emits the first sound and the second sound again (with the adjusted time offset): step E7.

In a third embodiment, the transmission and playback latency is evaluated on the basis of the model of the external speaker.

Use is made of a latency table comprising transmission and playback latency values for various Bluetooth speaker models. The latency table is stored in the connected speaker, or else may be obtained via the network, for example from an external centralized server. This solution has the advantage of not requiring any intervention from the user, and of having a good level of accuracy.

Advantageously, the latency table may be supplemented by transmission and playback latency values obtained under real conditions (and evaluated by the other methods that have been described) for the various Bluetooth speaker models, thus allowing the system to be enriched with new values as it is deployed by users.

A fourth embodiment uses a microphone integrated into the connected speaker, or else connected to the connected speaker. This method will make it possible either to calculate the transmission and playback latency or to refine the values obtained using the other methods that have just been described.

The transmission and playback latency is evaluated as follows.

In an initialization phase, the connected speaker transmits a test audio signal to a paired Bluetooth speaker via its Bluetooth interface.

Figure 11:
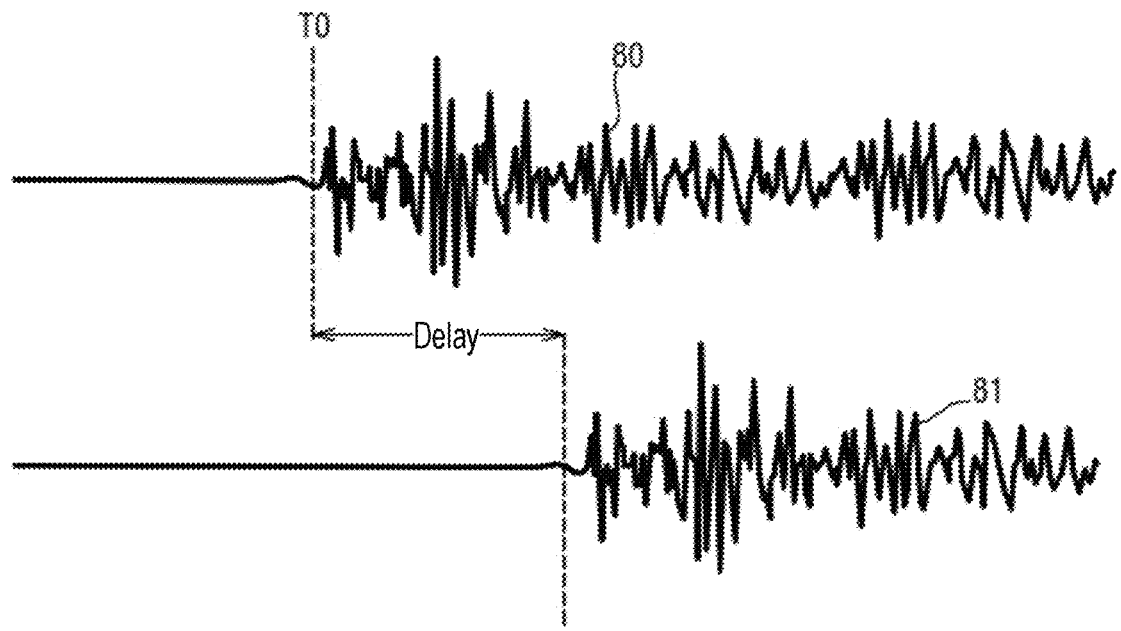
FIG. 11 comprises two graphs respectively showing a test audio signal and a received test sound signal.

One example of a test audio signal 80 may be seen in FIG. 11. The connected speaker considers that the (known) test audio signal 80 is sent at the time T0. The connected speaker controls the paired Bluetooth speaker such that it emits an emitted test sound signal produced from the test audio signal 80. The connected speaker then acquires a received test sound signal 81 via the microphone, and estimates the latency based on the test audio signal 80 and the received test sound signal 81. The transmission and playback latency is evaluated by calculating a cross-correlation between the test audio signal 80 and the received test sound signal 81. The peak of the cross-correlation corresponds to the real latency.

Cross-correlation has the advantage of coping with the superposition of other signals on the desired signal (interference, noise, music, etc.).

The test audio signal 80 and therefore the emitted test sound signal are now of more particular interest.

The emitted test sound signal may be a test signal dedicated to estimating the latency and be "isolated", that is to say transmitted without being accompanied by another sound signal. The emitted test sound signal comprises for example a "jingle".

The emitted test sound signal may also belong to the useful sound signal of audio/video content, for example a film, the playback of which is controlled by a user. The emitted test sound signal thus comprises any sounds from the film.

The emitted test sound signal may also be superimposed on the useful sound signal of the audio/video content. This solution is preferable because it is more reliable and more accurate than the previous one.

The emitted test sound signal is not necessarily audible, but may be inaudible to a human being—and therefore perfectly well suited to being superimposed on the useful sound signal of audio/video content. The emitted test sound signal may for example have a volume level situated below the absolute human hearing threshold, or else be masked by the useful sound signal of the audio/video content.

The cross-correlation is calculated as follows.

The cross-correlation is calculated over a time interval greater than the largest foreseeable offset (for example 5 s).

Over this time interval, the maximum obtained value of the cross-correlation between the test audio signal and the received test sound signal corresponds to the transmission and playback latency.

Calculating a cross-correlation over a large interval (in comparison with the size of the sample) is expensive in terms of calculations. It is possible if necessary to reduce the number of calculations required by performing a hierarchical series of cross-correlation calculations.

A sampling frequency of the test audio signal (used to calculate the cross-correlation) and of the received test sound signal is thus reduced in order to calculate a first approximation of the latency. It is possible for example to reduce the granularity of the sampling to 5 ms, which is tantamount to resampling the signals using a frequency of 200 Hz. This may be performed by sub-sampling the received test sound signal captured by the microphone, as well as the test audio signal (the two signals have to have the same sampling frequency in order to perform the calculation).

It should be ensured that the test audio signal and the received test sound signal are still identifiable at this sampling frequency: the patterns of the test audio signal should have a duration that is at least equal to twice the sampling frequency (for example 10 ms for a frequency of 200 Hz). A significantly longer duration of the patterns, for example equal to 100 ms, will preferably be chosen.

The sampling frequency is then increased and the latency is recalculated while keeping only a time window of reduced duration centred around the first approximation of the latency. It is then possible to perform one or more successive refinements.

It is advantageous for the accuracy to be to the value of a played-back sound sample. This means that, if the read operation is performed at 48 kHz in nominal mode, then the latency should be calculated with a granularity of 48 kHz.

When the emitted test sound signal is superimposed on the useful sound signal of audio/video content, or in the case of simultaneous measurement of the offset of a plurality of outputs, it is possible to improve the accuracy of the latency measurement as follows.

An emitted combined signal, which is the superimposition of the useful sound signal and of the emitted test sound signal, is emitted. A received combined signal, which therefore consists of the received test sound signal and of the received useful sound signal, is then received.

If the cross-correlation is calculated in the time domain, a bandpass frequency filter will preferably be used on the received combined signal captured by the microphone in order to isolate the received test sound signal from the received useful sound signal, and thus improve the accuracy of the calculation of the cross-correlation between the test audio signal and the received combined signal.

As an alternative, the cross-correlation may be calculated in the frequency domain. The temporal representations of the test audio signal and of the received test sound signal are first of all transformed into frequency representations (using an appropriate transform, such as an FFT), and the cross-correlation is then calculated only on the frequency band containing the received test sound signal to be identified. This makes it possible to eliminate measurement errors that could result from other frequencies.

Figure 12:
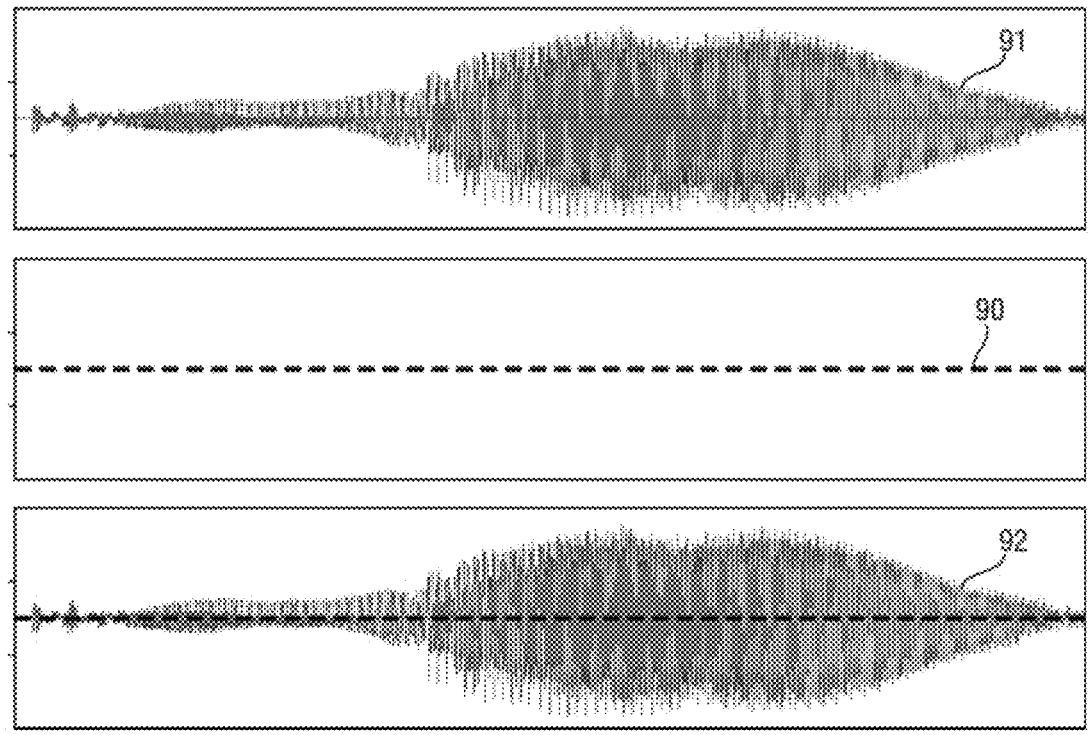
FIG. 12 comprises three graphs respectively showing, in the time domain, a useful sound signal, an emitted test sound signal and an emitted combined signal.
Figure 13:
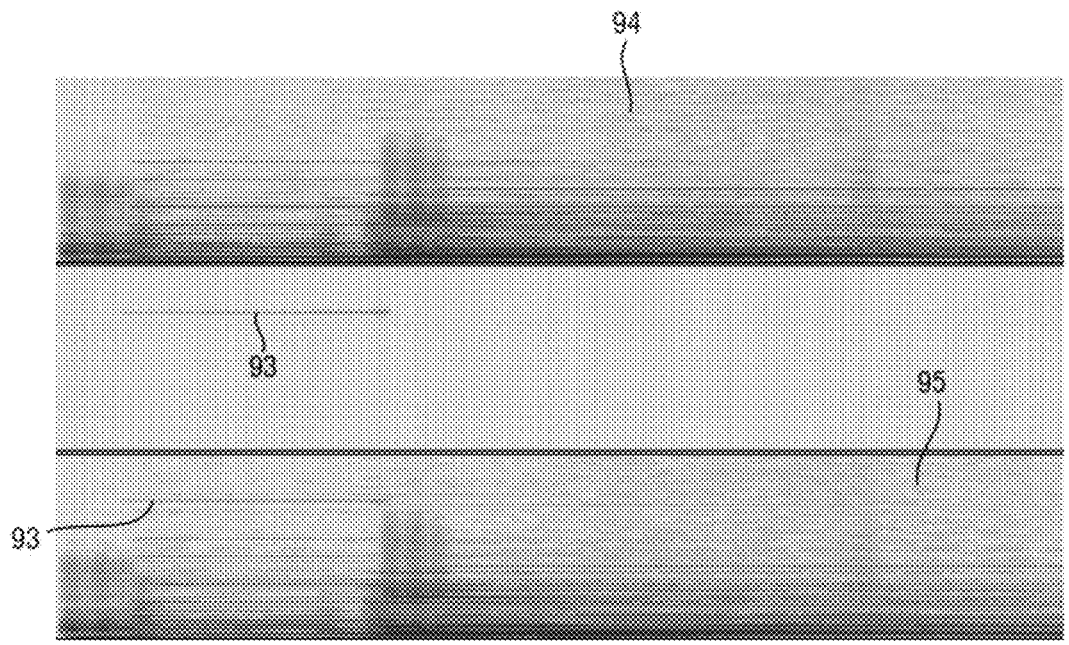
FIG. 13 comprises three graphs respectively showing, in the frequency domain, a useful sound signal, an emitted test sound signal and an emitted combined signal.

FIGS. 12 and 13 illustrate an improvement in the detection, which is observed when this is performed in the frequency domain.

In FIG. 12, the signals are shown in the time domain.

The emitted test sound signal 90 is superimposed on a useful sound signal 91 in order to form an emitted combined signal 92. The emitted test sound signal 90 is a 15 kHz low-amplitude signal and is inaudible. The emitted test sound signal 90 is almost invisible in this representation, due to its low amplitude. It is observed that the emitted combined signal 92 is highly similar to the useful sound signal 91. As a result, evaluating the delay by calculating the cross-correlation between the test audio signal and the received combined signal (resulting from the emitted combined signal 92) will not be effective.

In FIG. 13, the signals are shown in the frequency domain, by a spectrogram ranging from 0 to 20 kHz. The emitted test sound signal 93 is again superimposed on a useful sound signal 94.

The emitted test sound signal 93 is a 15 kHz low-amplitude signal and is inaudible. The emitted test sound signal 93 is easily visible in this frequency representation.

The emitted test sound signal 93 is also easily visible in the frequency representation of the emitted combined signal 95. Evaluating the delay by calculating the correlation in the frequency domain will therefore be more effective, and the risk of errors will be lower. The risk of errors will be reduced even further by keeping only a frequency band containing the emitted test sound signal, for example here the band ranging from 14 500 Hz to 15 500 Hz.

It will be noted that the emitted test sound signal that is used in this example is simplified in order to facilitate the illustration of the invention. Under real conditions, a more complex emitted test sound signal, combining for example various periods of emitting alternating frequencies with periods of silence, will advantageously be used.

During the audio read operation, the target clock of a Bluetooth audio receiver, that is to say in this case of a Bluetooth speaker, is slaved to the source clock of the emitter, considered to be master, the emitter in this case being the connected speaker. There is therefore no reason a priori for the source clock and the target clock to drift from one another during the audio read operation.

However, if two Bluetooth speakers are each paired with a different connected speaker (rather than being paired with one and the same connected speaker), it is possible for drift to occur between the two source clocks, thereby creating an offset between the target clocks of the two Bluetooth speakers.

This may be detected by the connected speaker during the read operation, using the microphone in a manner similar to the initial detection of the transmission and playback latency, using emitted test sound signals that are possibly inaudible to a human, superimposed on the useful sound signal to be reproduced by the Bluetooth speakers paired with the connected speaker.

The emitted test sound signal may differ between the two Bluetooth speakers, or else be identical. In the latter case, the detection is alternatively performed between the left-hand and right-hand rear speakers, the test audio signal being sent only on the channel to be tested.

To improve the consistency of the overall sound playback, the connected speaker may adjust the volume of the distributed audio signal or signals that are allocated and transmitted to the Bluetooth speakers, but also of the distributed audio signal allocated to said connected speaker and of the distributed audio signal or signals transmitted to one or more other connected speakers.

Specifically, it is unlikely that the gains of speakers of different models will be identical, and playback as such would then produce a perceived difference in volume between the various Bluetooth speakers. The connected speaker will then adjust the gain of one or more audio channels incorporating the Bluetooth speakers in order to compensate this gain difference. The values of the adjustments to be applied may be obtained by various means, for example provided by the user (via a configuration interface). The values may also be obtained via a correspondence table between known speaker models and gains.

The connected speaker may also apply a frequency adjustment (of frequency equalization type) to one or more audio channels incorporating the Bluetooth speakers, in order to improve the acoustic consistency between the connected speakers and the Bluetooth speakers. The values may be obtained using various means, such as those described for the above point.

It will be noted that, although it is preferable, in order to have optimum sound quality, for the two Bluetooth speakers paired with the connected speaker to be of identical models, the audio system could also work if the two Bluetooth speakers are of different models.

In this case, the connected speaker may optionally adapt different frequency equalization to the two audio channels incorporating the Bluetooth speakers, in order to compensate their different frequency response.

Moreover, managing paired Bluetooth speakers leads to an increase in the read latency of the connected speaker in comparison with a configuration in which the connected speaker is used on its own. Advantageously, the connected speaker evaluates a value of the read latency and transmits the value of the read latency to the decoder box.

This could be performed using various means, such as for example an API available on the connected speaker, or else a message sent by the connected speaker to the sound source asking it to send a sound wave (in this case the decoder box).

It has been described here that the connected speaker or speakers according to the invention play back the front audio channels of the audio playback system, whereas the Bluetooth speaker or speakers play back the rear audio channels. However, it is of course possible to implement another spatial distribution of the audio channels.

For example, the Bluetooth speakers could play back the front audio channels and a pair of connected speakers could play back the rear audio channels, or else a single Bluetooth speaker could play back the central front audio channel, whereas two connected speakers play back the other audio channels.

The invention is likewise not limited to managing and playing back multichannel sounds. The invention may be implemented for stereo playback (for example a pair of connected speakers and a Bluetooth speaker play back the left-hand audio channel, whereas another pair of connected speakers and a Bluetooth speaker play back the right-hand audio channel). Mono playback may also be contemplated.

It is also possible to create virtual spatialization (for example by applying reverb or chorus effects) based on the incoming audio signal, independently of the number of channels thereof.

The system may also create new channels for Bluetooth speakers from the received channels, but that have a target spatial configuration different from the configuration of the input audio signal, by way of a channel recalculation operation.

These configurations are examples, illustrating the fact that the invention may be applied to various source and target channel configurations.

Figure 14:
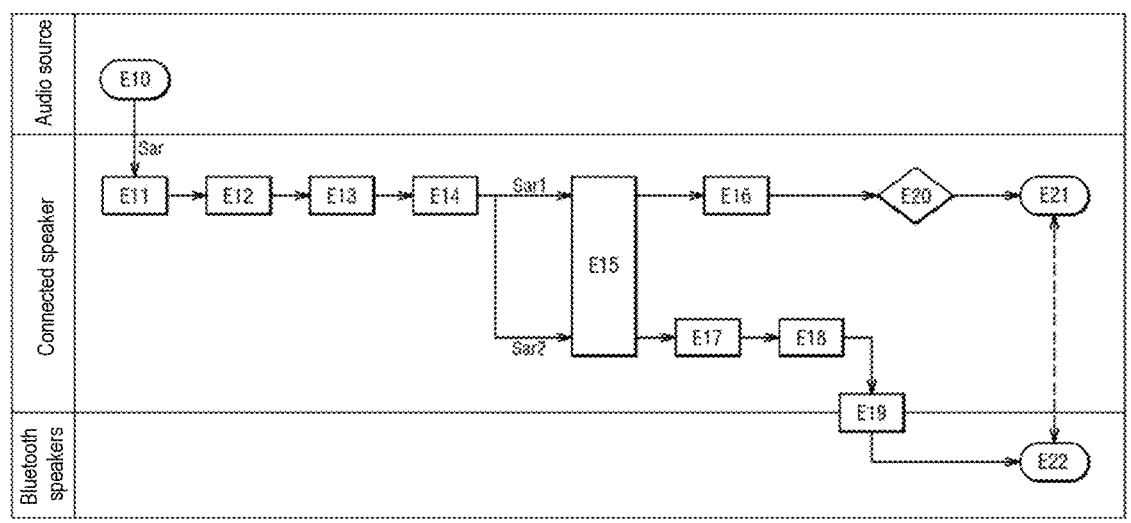
FIG. 14 shows steps of an audio playback method.

FIG. 14 makes it possible to summarize the audio playback method that has just been described.

The decoder box transmits an input audio signal Sae, which is in this case a multichannel audio flow (step E10).

The connected speaker receives the input audio signal Sae via its Wi-Fi interface (step E11). The decoder module decodes the input audio signal (step E12). The splitter module splits the distributed audio signals (step E13), which are allocated to the Bluetooth speakers paired with the connected speaker.

The audio channels are possibly spatially redistributed (step E14).

This then gives a first distributed audio signal Sar1 allocated to the front audio channels (that is to say intended to be played back by the connected speaker) and a second distributed audio signal Sar2 allocated to the rear audio channels (that is to say intended to be played back by the Bluetooth speakers).

The gain of the first distributed audio signal Sar1 and the gain of the second distributed audio signal Sar2 are potentially adjusted (step E15).

The first distributed audio signal Sar1 is buffer-stored (step E16).

Frequency equalization is possibly performed on the second distributed audio signal Sar2 (step E17). The second distributed audio signal Sar2 is encoded using the AD2P codec (step E18).

The second distributed audio signal Sar2 is then transmitted to the Bluetooth speakers (step E19).

The connected speaker evaluates the time that has elapsed after the start of the transmission of the second distributed audio signal (step E20) and, when the elapsed time is equal to the evaluated transmission and playback latency of the Bluetooth speakers, the connected speaker plays a first sound signal corresponding to the first distributed audio signal (step E21).

The Bluetooth speakers for their part play a second sound signal corresponding to the second distributed audio signal (step E22).

The first sound signal and the second sound signal are perfectly synchronized.

Of course, the invention is not limited to the embodiments described, but includes all variants that fall within the scope of the invention as defined by the claims.

The invention claimed is:

1. A connected speaker comprising:
 a LAN interface;
 a WPAN interface;
 pairing means designed to pair the connected speaker with one or more external speakers each equipped with an external WPAN interface;
 processing means designed to acquire an input audio signal from an audio source via the LAN interface, to produce at least one distributed audio signal from the input audio signal, to allocate each distributed audio signal to one of the external speakers paired with the connected speaker, and to transmit, to each external speaker, via the WPAN interface of the connected speaker and the external WPAN interface of said external speaker, the distributed audio signal that is allocated to said external speaker, such that the connected speaker and the external speakers form a multichannel audio playback system,
 the connected speaker furthermore being designed to evaluate a transmission and playback latency resulting from the transmission of a distributed audio signal to an external speaker via the WPAN interface and from the playback of the distributed audio signal by the external speaker, the evaluation of the transmission and playback latency being used to ensure synchronized playback by the multichannel audio playback system, wherein
 the transmission and playback latency is evaluated on the basis of an expected transmission and playback latency value specific to a codec used to transmit the distributed audio signal, or
 the transmission and playback latency is evaluated using a calibration method involving a user, the calibration method comprising the steps of simultaneously having the connected speaker emit a first sound and the external speaker emit a second sound, and adjusting a time offset applied to an output of the connected speaker connected to the external speaker until the user hears the first sound and the second sound simultaneously, or
 the transmission and playback latency is evaluated on the basis of a model of the external speaker, or
 the connected speaker incorporating or being connected to a microphone, the connected speaker being designed to transmit a test audio signal (80) to the external speaker via the WPAN interface, to control the external speaker such that it emits an emitted test sound signal produced from the test audio signal, to acquire a received test sound signal via the microphone, and to estimate the transmission and playback latency based on the test audio signal and the received test sound signal.

2. The connected speaker according to claim 1, the connected speaker being able to be paired individually with at least two external speakers, the connected speaker being designed to transmit, directly to each external speaker, the distributed audio signal that is allocated to said external speaker.

3. The connected speaker according to claim 1, the connected speaker being able to be paired with a first external speaker that is itself paired with a second external speaker, the connected speaker being designed to transmit, directly to the first external speaker, a first distributed audio signal allocated to the first external speaker and a second distributed audio signal allocated to the second external speaker, the second distributed audio signal then being able to be transmitted to the second external speaker by the first external speaker.

4. The connected speaker according to claim 1, the connected speaker being a multichannel speaker.

5. The connected speaker according claim 1, the connected speaker being a single-channel speaker designed to be connected to another connected speaker via the LAN interface.

6. The connected speaker according to claim 1, wherein the transmission latency is evaluated by calculating a cross-correlation between the test audio signal and the received test sound signal.

7. The connected speaker according to claim 6, wherein the cross-correlation is calculated in the time domain.

8. The connected speaker according to claim 6, wherein the cross-correlation is calculated in the frequency domain.

9. The connected speaker according to claim 8, the connected speaker being designed to reduce a sampling frequency of the test audio signal and of the received test sound signal, to calculate a first approximation of the transmission and playback latency, and then to increase the sampling frequency and to recalculate the transmission and playback latency while keeping only a time window of limited duration centred around the first approximation of the transmission and playback latency.

10. The connected speaker according to claim 1, wherein the emitted test sound signal is superimposed on a useful sound signal of played-back audio content.

11. The connected speaker according to claim 1, wherein the emitted test sound signal is a signal that is normally inaudible to a human being.

12. The connected speaker according to claim 1, the connected speaker being designed to adjust a gain and/or to perform a frequency adjustment on at least one audio channel incorporating an external speaker.

13. The connected speaker according to claim 1, the connected speaker being designed to evaluate a value of a read latency of the connected speaker, and to transmit the value of the read latency to the audio source.

14. The connected speaker according to claim 1, wherein the pairing means implement pairing using the A2DP Bluetooth profile.

15. The connected speaker according to claim 1, wherein the pairing means comprise a physical button.

16. The connected speaker according to claim 1, wherein the pairing means comprise a pairing module designed to interact with a configuration interface provided by an API or by a configuration webpage.

17. The connected speaker according to claim 1, wherein the LAN interface is a Wi-Fi interface.

18. The connected speaker according to claim 1, wherein the LAN interface is an Ethernet interface.

19. The connected speaker according to claim 1, wherein the WPAN interface is a Bluetooth interface.

20. An audio playback method implemented in a connected speaker according to claim 1, comprising the steps of:
pairing the connected speaker with one or more external speakers each equipped with an external WPAN interface;
acquiring an input audio signal from an audio source via the LAN interface;
producing at least one distributed audio signal from the input audio signal;
allocating each distributed audio signal to one of the external speakers paired with the connected speaker;
transmitting, to each external speaker, via the WPAN interface of the connected speaker and the external WPAN interface of said external speaker, the distributed audio signal that is allocated to said external speaker, such that the connected speaker and the external speakers form a multichannel audio playback system.

21. A non-transitory computer-readable recording medium comprising instructions that cause a connected speaker comprising:
a LAN interface;
a WPAN interface;
pairing means designed to pair the connected speaker with one or more external speakers each equipped with an external WPAN interface;
processing means designed to acquire an input audio signal from an audio source via the LAN interface, to produce at least one distributed audio signal from the input audio signal, to allocate each distributed audio signal to one of the external speakers paired with the connected speaker, and to transmit, to each external speaker, via the WPAN interface of the connected speaker and the external WPAN interface of said external speaker, the distributed audio signal that is allocated to said external speaker, such that the connected speaker and the external speakers form a multichannel audio playback system,
the connected speaker furthermore being designed to evaluate a transmission and playback latency resulting from the transmission of a distributed audio signal to an external speaker via the WPAN interface and from the playback of the distributed audio signal by the external speaker, the evaluation of the transmission and playback latency being used to ensure synchronized playback by the multichannel audio playback system, to execute the steps of the audio playback method according to claim 20.

* * * * *